US009231721B1

United States Patent
Varadarajan et al.

(10) Patent No.: US 9,231,721 B1
(45) Date of Patent: Jan. 5, 2016

(54) SYSTEM AND METHOD FOR SCALING TOTAL CLIENT CAPACITY WITH A STANDARD-COMPLIANT OPTICAL TRANSPORT NETWORK (OTN)

(75) Inventors: Badri Varadarajan, Mountain View, CA (US); Bert Klaps, Herent (BE)

(73) Assignee: Applied Micro Circuits Corporation, Santa Clara, CA (US)

( * ) Notice: Subject to any disclaimer, the term of this patent is extended or adjusted under 35 U.S.C. 154(b) by 471 days.

(21) Appl. No.: 13/536,841

(22) Filed: Jun. 28, 2012

(51) Int. Cl.
H04J 3/16 (2006.01)
H04J 14/00 (2006.01)

(52) U.S. Cl.
CPC .............. *H04J 3/1652* (2013.01); *H04J 3/1658* (2013.01); *H04J 14/005* (2013.01); *H04J 2203/0001* (2013.01)

(58) Field of Classification Search
None
See application file for complete search history.

(56) References Cited

U.S. PATENT DOCUMENTS

| | | | |
|---|---|---|---|
| 7,028,241 B1 * | 4/2006 | Blair | H04L 1/0041 714/746 |
| 7,930,616 B2 | 4/2011 | Gerstel et al. | |
| 8,699,411 B1 * | 4/2014 | Gossett et al. | 370/328 |
| 2008/0256421 A1 * | 10/2008 | Gerstel et al. | 714/776 |
| 2010/0040370 A1 * | 2/2010 | Aoki | H04J 3/1652 398/58 |
| 2010/0142947 A1 * | 6/2010 | Shin | H04J 3/1652 398/43 |
| 2011/0135304 A1 * | 6/2011 | Katagiri | H04J 3/1629 398/45 |
| 2012/0002965 A1 * | 1/2012 | Bellato et al. | 398/52 |
| 2012/0106956 A1 * | 5/2012 | Rao | H04J 3/12 398/52 |
| 2012/0134674 A1 * | 5/2012 | Shin | H04J 3/0623 398/58 |
| 2012/0266051 A1 * | 10/2012 | Farhoodfar et al. | 714/782 |
| 2013/0031437 A1 * | 1/2013 | Farhoodfar | H03M 13/2707 714/752 |
| 2013/0311847 A1 * | 11/2013 | Miyata | H03M 13/1102 714/755 |
| 2013/0343750 A1 * | 12/2013 | Lanzone et al. | 398/34 |
| 2014/0164546 A1 * | 6/2014 | Doidge | G06F 5/14 709/213 |

OTHER PUBLICATIONS

Tychopoulos et al., "Demonstration of a low-cost inband FEC scheme for STM-64 transparent metro networks", in Proc. IEEE Intern Conf. Transparent Optic Networks 2006, Tu.A3.4.
Tychopouios at al, "A Tutorial Overview on the Evolution of Architectures and the Future Prospects of Outband and Inband FEC for Optical Communications", IEEE Circuits & Devic.
(Continued)

*Primary Examiner* — Ayaz Sheikh
*Assistant Examiner* — Mariela Vidal Carpio
(74) *Attorney, Agent, or Firm* — Amin, Turocy & Watson, LLP

(57) ABSTRACT

In an Optical Transport Network (OTN) system, methods and devices are provided for communicating rate-adaptive OTUk frames. One method determines channel statistics for a fiber span connecting a transmitter to a receiver. A client input data rate is determined that is sufficient to meet a minimum communication threshold, and a rate-adaptive OTUk frame format is determined sufficient to carry the client input data rate. The format comprises a set of (n) allocated slots of client input data in a rate-adaptive OTUk frame comprising (m) slots, where (n) is less than or equal to (m). The method then fills the rate-adaptive OTUk frame, including (m–n) unallocated slots, using one of two processes. The first process fills the rate-adaptive OTUk frame with parity bits computed from client input data. The second process fills at least a portion of the rate-adaptive OTUk frame with and dummy bits.

18 Claims, 8 Drawing Sheets

(56) References Cited

OTHER PUBLICATIONS

Gwang-Hyun Gho et al., "Rate-Adaptive Coding for Optical Fiber Transmission Systems", Jour. Lightwave Tech., vol. 29, 2, Jan. 15, 2011, p. 222.
ITU-T G.694.1, "Spectral grids for WDM applications", Feb. 2012.
O. Gerstel et al, "Elastic Optical Networking: A New Dawn for the Optical Layer?" IEEE Comm. Magazine, Feb. 2012.
S. J. Savory et al., "Electronic Compensation of Chromatic Dispersion Using a Digital Coherent Receiver," in Opt. Express, vol. 15, No. 5, pp. 2120-2126, Mar. 2007.
D. L. McGhan, W. Leckie, C. Chen, Reconfigurable Coherent Transceivers for Optical Transmission Capacity and Reach Optimization, OW4C.7, OFC 2012.
Interlaken Alliance, "Interlaken Protocol Definition Revision 1.2" Oct. 2008.
ITU-T G.709/Y.1331, "Interfaces for the Optical Transport Network (OTN)" Feb. 2012.
O. Gerstel et al, "Elastic Optical Networking: A New Dawn or the Optical Layer?", IEEE Comm. Mag., pp. S12-S20, Feb. 2012.
G. Caire, G. Taricco and E. Biglieri, "Bit-interleaved Coded Modulation," IEEE Trans. Info. Theory, vol. 44, No. 3, pp. 927-946, May 1998.
U. Wachsmann, R. Fischer, J. Huber, "Multilevel Codes : Theoretical Concepts and Practical Design Rules," IEEE Trans. Info. Theory, vol. 45, No. 5, pp. 1361-1391, Jul. 1999.
G-H Oho, L. Klak, J. Kahn, "Rate-Adaptive Coding for Optical Fiber Transmission Systems," Journal of Lightwave Tech., vol. 29, No. 2, pp. 222-233, Jan. 2011.

\* cited by examiner

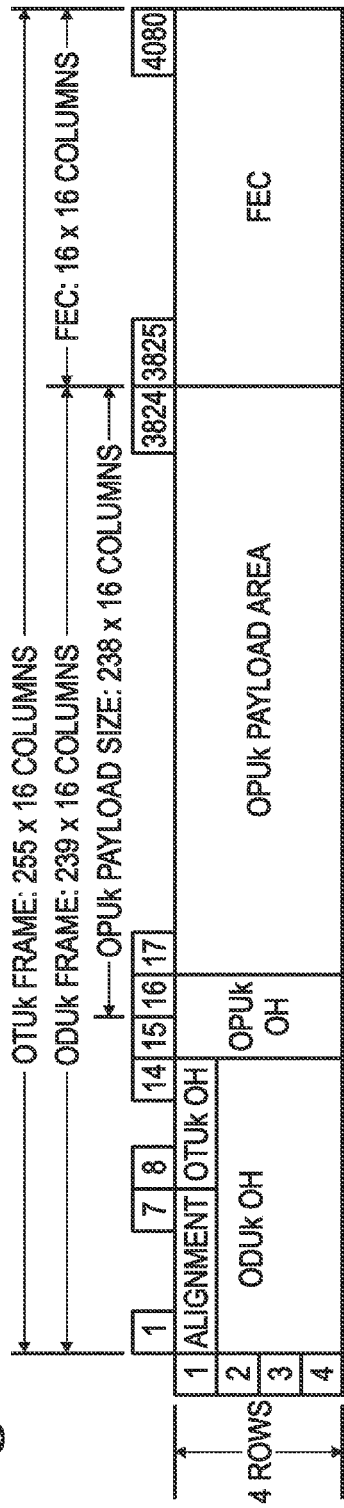
Fig. 3 *(PRIOR ART)*
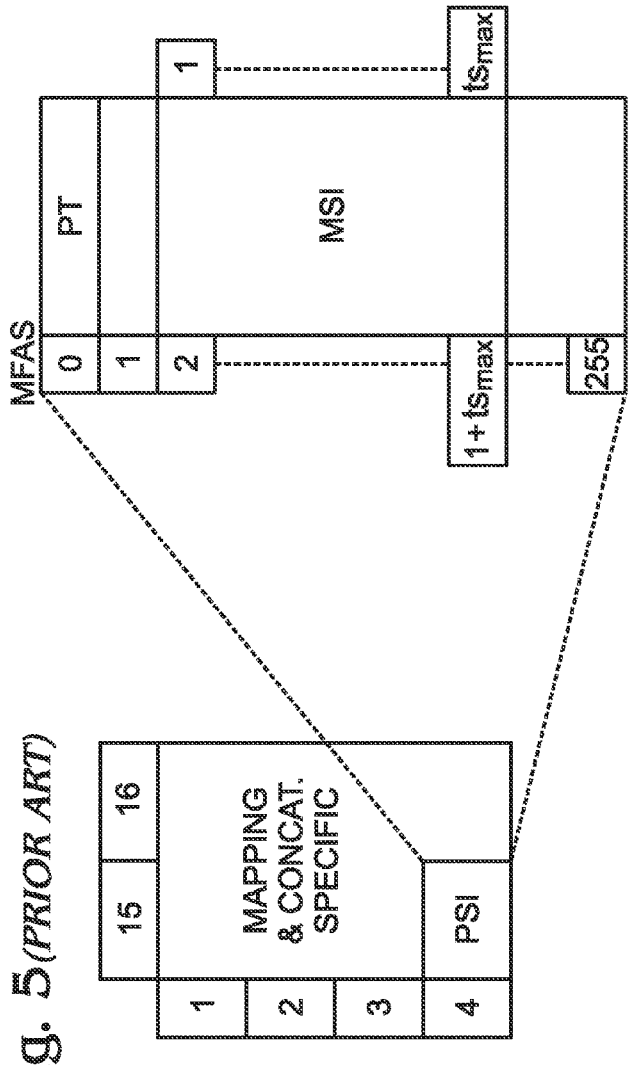
Fig. 5 *(PRIOR ART)*

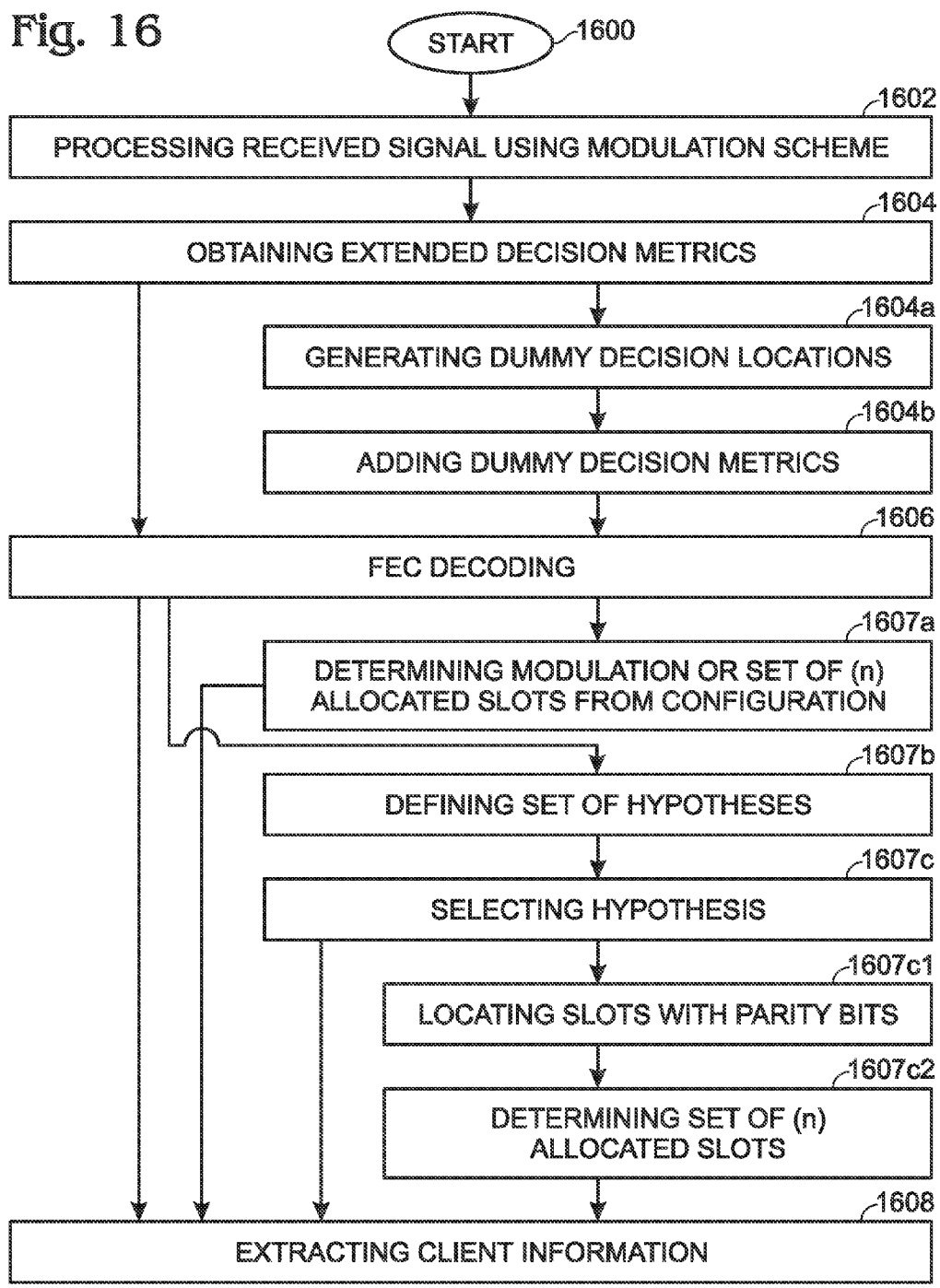

SYSTEM AND METHOD FOR SCALING TOTAL CLIENT CAPACITY WITH A STANDARD-COMPLIANT OPTICAL TRANSPORT NETWORK (OTN)

BACKGROUND OF THE INVENTION

1. Field of the Invention

This invention generally relates to Optical Transport Networks (OTNs) and, more particularly, to a system and method for scaling the total client date rate to match the available optical link capacity.

2. Description of the Related Art

FIG. 3 is a diagram depicting the G.709 OTUk/ODUk/OPUk frame format (prior art). The basic OTN container is an optical channel data unit (ODU) which can have a fixed rate (ODUk with k=0, 1, 2, 3, 4) or a variable rate (ODUflex). The G.709 ODUk frame format is identical for all rates (ITU-T G.709/Y.1331, "Interfaces for the Optical Transport Network (OTN)", February 2012). It can be represented as a structure of four rows and 3824 columns. This structure, in turn, consists of various layers of signaling and overhead attached to a basic optical payload unit (OPU).

The OPU, spanning all four rows and columns 17-3824 is itself a composite of multiple tributary slots, each targeted for a rate of typically 1.25 gigabits per second (Gbps). Thus, the number of slots per frame is $N_s$=2, 8, 32 and 80 for k=1-4, achieving data rates of 2.5, 10, 40 and 80 Gbit/s respectively. By defining tributary slots, G.709 allows multiplexing of many lower-rate clients into an OTUk pipe. In this case, each client is mapped into this payload area through one of the constant bit rate mapping procedures, e.g. for SONET/SDH or Ethernet PCS, or through generic framing procedure (GFP), e.g. for MPLS packets or Ethernet MAC frames. Time division multiplexing of lower-rate ODUj into higher-rate ODUk (with j<k) is also supported. Each of the lower-rate ODUs is identified by a tributary port number and the appropriate amount of tributary slots is allocated to it.

FIG. 4 is a diagram depicting the position of a tributary slot within an OPUk payload area (prior art). The allocation of slots to sub-containers is signaled as part of the OPUk overhead, which constitutes columns 15 and 16 of the OTN frame structure.

FIG. 5 is a diagram depicting the multiplex structure identifier (MSI) signaled over 256 frames (prior art). Specifically, the multiplex structure is signaled end-to-end using the payload structure identifier (PSI) byte of each OTN frame (row 4, column 15). The signaling is accomplished over a multiframe, comprising 256 consecutive frames. Of the 256-byte PSI received in a multiframe, the MSI field starts at PSI byte 2 and has one byte entry per tributary slot. Each MSI entry indicates if the corresponding tributary slot is allocated to a tributary port or free.

In addition to the OPU payload and the OPUk overhead, the OTN frame also comprises ODUk overhead (rows 2-4, columns 1-14); OTUk overhead (row 1, column 1-14) which also includes frame alignment. In "standard" implementations of OTN, a Reed-Solomon based FEC is computed on the entire ODUk frame to obtain the last 256 columns of the OTUk frame.

FIG. 1 is a schematic diagram depicting a conventional OTN system (prior art). The OTN connects various sites over metro or long haul distances, as shown. The optical fibers running through the network carry many different physical channels, also known as "wavelengths". A physical channel comprises a center wavelength typically in the optical C band, and a bandwidth (50 GHz with the standard ITU grid (ITU-T G.694.1, "Spectral grids for WDM applications", February 2012) or higher in the case of "super channels", see O. Gerstel et al, "Elastic Optical Networking: A New Dawn for the Optical Layer?" IEEE Comm. Magazine, February 2012. As shown in the figure, each site contains a reconfigurable optical add drop multiplexer (ROADM) which "drops" m receive channels {ARi} and "adds" n transmit channels {ATj}. Adjacent sites are connected by a stretch of optical fiber, divided into spans of typically around 100 km each. Each span is terminated using an optical amplifier, denoted R in the figure. These amplifiers, typically Erbium doped fiber amplifiers (EDFA), compensate for fiber attenuation. In addition, span termination may also include optical dispersion compensation.

FIG. 2 is a graph depicting optical signal-to-noise (OSNR) to the number of spans (prior art). A physical channel extends from the allocated transmitter site "T" to the allocated receiver site "R", and may pass through ROADMs at many different intermediate sites. Amplifiers (both for span compensation and in EDFAs) add noise to the optical signal, hence the optical signal-to-noise ratio (OSNR) typically decreases with the distance spanned by the physical channel. The curve shows the available OSNR, with 12.5 dB OSNR being the required value for 100 gigabits per second (Gps).

The OSNR in a physical channel, along with other factors such as non-linearity, polarization mode dispersion, etc., determines the available capacity of the channel, i.e., the maximum spectral efficiency (b/s/Hz) that can be achieved on the channel.

The goal of communication system design is to choose modulation and forward error correction (FEC) schemes to achieve data rates close to channel capacity. The first step towards achieving this goal has been taken, with the use of coherent modulation at the transmitter and advanced signal processing at the receiver (see, for example, Savory et al., "Electronic Compensation of Chromatic Dispersion using a Digital Coherent Receiver", Opt. Express, Vol. 15, No. 5, pp. 2120-2126, March 2007. Current deployments achieve a fixed rate of 100 Gbps over 50 GHz channels using polarization-multiplexed QPSK (ITU-T G.975.1, "Forward Error Correction for High Bit-rate DWDM Submarine Systems," February 2004) (PM-QPSK), at a spectral efficiency of 2 b/s/Hz. Now, PM-QPSK requires an OSNR of around 12.5 dB to operate (more or less depending on the equalization and phase tracking algorithms and the forward error correction FEC used). As seen from FIG. 2, the available OSNR in the link is often greater than the minimum required. Limiting data rate to 100 Gbps in shorter links is clearly a waste of available capacity. To better utilize available channel capacity, next generation deployments target the use of higher order modulation schemes to achieve higher spectral efficiencies for links with high OSNR (see, for instance, D. L. McGhan, W. Leckie, C. Chen, Reconfigurable Coherent Transceivers for Optical Transmission Capacity and Reach Optimization, OW4C.7, OFC 2012).

It would be advantageous if the channel capacity of an OTN link could be more efficiently utilized.

SUMMARY OF THE INVENTION

Coherent transceivers can communicate at data rates approaching the capacity of fiber links in optical transport networks (OTN). However, the link capacity in both metro and long-haul networks varies depending on the length and quality of the fiber in the link, the amplifiers, and other factors. Disclosed herein is a method to adapt data rate to varying channel capacity by using the definition of time-division multiplexed slots in the ITU-T G.709-compliant frames. Specifically, the data rate is varied by changing the number of slots allocated to client data in an OTN frame. The remaining slots may be either discarded before modulation, or filled in with forward error correction (FEC) parity bits. Receiver techniques to automatically detect and decode variable-rate OTN frames without any additional signaling are described. The techniques also preserve existing serial interfaces and signaling schemes. Example systems employing both methods are described, and design implications for the transceiver and for the system are presented.

Accordingly, in an OTN system, a method is provided for communicating rate-adaptive OTUk frames. The method determines channel statistics for a fiber span connecting a transmitter to a receiver. A client input data rate is determined that is sufficient to meet a minimum communication threshold, and a rate-adaptive OTUk frame format is determined sufficient to carry the client input data rate. The format comprises a set of (n) allocated slots of client input data in a rate-adaptive OTUk frame comprising (m) slots, where (n) and (m) are positive integers, and where (n) is less than or equal to (m). The method then fills the rate-adaptive OTUk frame, including (m−n) unallocated slots, using one of two processes. The first process fills the rate-adaptive OTUk frame with parity bits computed from client input data. The second process fills at least a portion of the rate-adaptive OTUk frame with dummy bits.

Additional details of a method for generating a rate-adaptive OTUk frame, a method receiving client information from a rate-adaptive OTUk frame, a transmitter for generating a rate-adaptive OTUk frame, a physical layer transceiver for modulation rate-adaptive OTUk frames and for demodulating the received signal to generate decision metrics at the receiver, and a receiver for extracting client information from a rate-adaptive OTUk frame, are provided below.

BRIEF DESCRIPTION OF THE DRAWINGS

FIG. 3 is a diagram depicting the G.709 OTUk/ODUk/OPUk frame format (prior art).

FIG. 5 is a diagram depicting the multiplex structure identifier (MSI) signaled over 256 frames (prior art).

FIG. 16 is a flowchart illustrating a method for receiving client information from a rate-adaptive OTUk frame in an OTN device.

DETAILED DESCRIPTION

Figure 6:
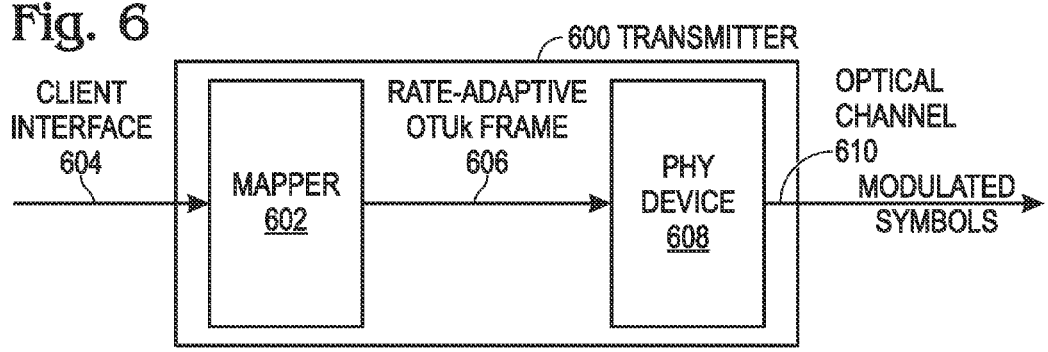
FIG. 6 is a schematic block diagram of a transmitter for generating a rate-adaptive OTUk frame in an Optical Transport Network (OTN).

FIG. 6 is a schematic block diagram of a transmitter for generating a rate-adaptive OTUk frame in an Optical Transport Network (OTN). The transmitter 600 comprises a mapper 602 having at least one client interface 604 to accept client input data. Although a single client interface is shown for simplicity, it should be understood that there may be a plurality of client inputs. The mapper 602 maps the client input data into a set of (n) allocated slots (i.e. allocated tributary slots) in a rate-adaptive OTUk frame on line 606 comprising (m) slots, where (n) and (m) are positive integers, and where (n) is less than or equal to (m). The mapper 602 also fills the rate-adaptive OTUk frame, including (m−n) unallocated slots, using one of two processes, see FIGS. 7 and 8.

Figure 7:
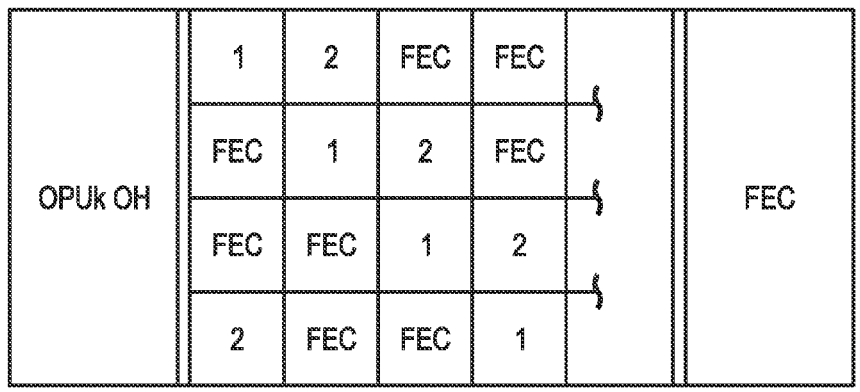
FIG. 7 depicts a process that fills the rate-adaptive OTUk frame using parity bits computed from client input data.

FIG. 7 depicts a process that fills the rate-adaptive OTUk frame using parity bits computed from client input data. In this example, two slots, 1 and 2, are allocated for client input data. The other slots are filled with FEC information derived from the client data in slot 1, slot 2, or both slots 1 and 2.

Figure 8:
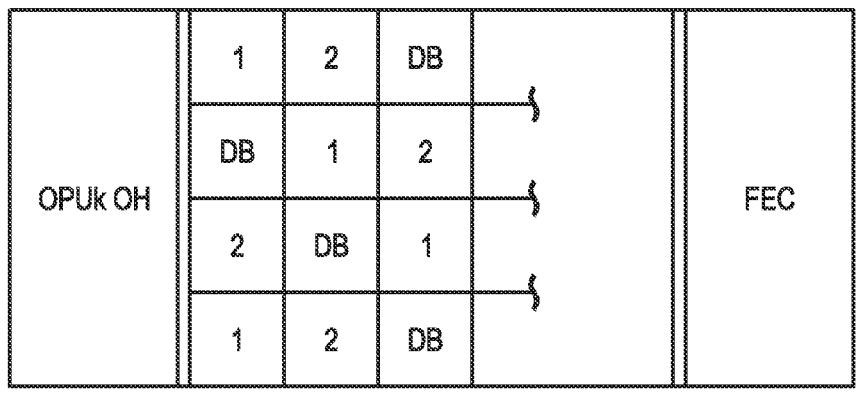
FIG. 8 depicts a process that fills at least a portion of the rate-adaptive OTUk frame with dummy bits (DBs).

FIG. 8 depicts a process that fills at least a portion of the rate-adaptive OTUk frame with dummy bits (DBs). In one aspect, the mapper fills the unallocated slots with dummy bits. A portion of the rate-adaptive OTUk frame (e.g. the FEC section of the OPUk frame) can be filled using a set of parity bits computed using FEC encoding on data in the allocated and unallocated slots in the rate-adaptive OTUk frame.

Figure 9:
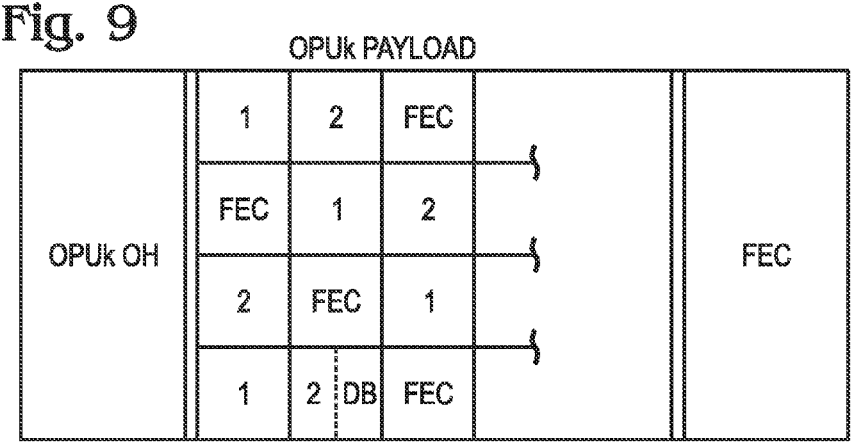
FIG. 9 depicts a frame where the mapper fills at least one allocated slot with dummy bits when the client input data does not fill all (n) allocated slots, and fills unallocated slots with forward error correction (FEC) bits computed from data in the allocated slots.

FIG. 9 depicts a frame where the mapper fills at least one allocated slot with dummy bits when the client input data does not fill all (n) allocated slots, and fills unallocated slots with FEC bits computed from data in the allocated slots. As shown, slots 1 and 2 are allocated to client input data. Dummy bits have been added to fill slot 2.

Returning to FIG. 6, in one aspect, the framer 600 further comprises a physical layer (PHY) device 608 having an electrical interface on line 606 to accept the rate-adaptive frame. Alternatively but not shown, the interface may comprise multiple parallel electrical interfaces. The physical layer device 608 detects unallocated slots in the rate-adaptive OTUk frame, and discards some bits in the rate-adaptive OTUk frame, including at least one bit in the unallocated slots, to obtain a transmit bit stream. In one aspect, the PHY device 608 discards all the dummy bits added to the unallocated slots, see FIG. 8. The PHY device 608 converts the transmit bit stream into a sequence of modulated symbols, and transmit the modulated symbols via an optical interface on an optical channel 610.

Figure 10:
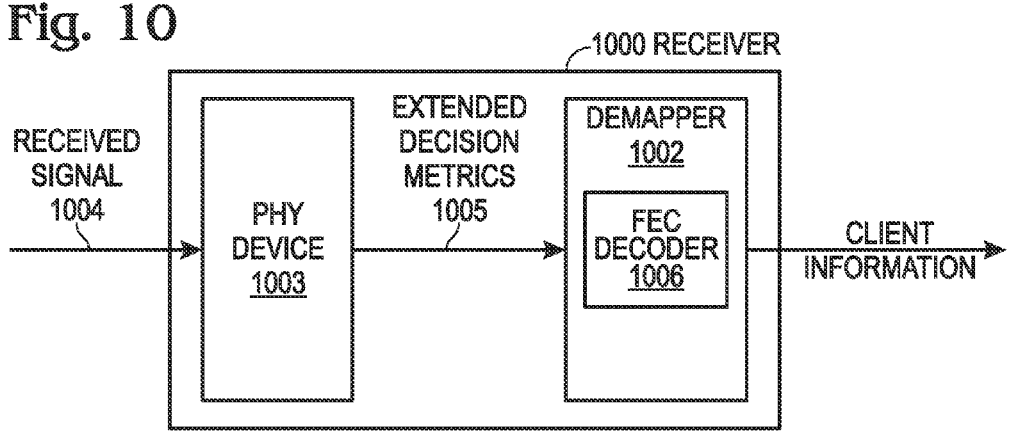
FIG. 10 is a schematic block diagram depicting a receiver for extracting client information from a rate-adaptive OTUk frame in an OTN.

FIG. 10 is a schematic block diagram depicting a receiver for extracting client information from a rate-adaptive OTUk frame in an OTN. The receiver 1000 comprises a demapper 1002 and a PHY device 1003 having an interface on line 1004 to accept a received signal. The PHY device 1003 processes the received signal using a modulation scheme to obtain decision metrics for all bits in a received bitstream. The PHY device 1003 uses the decision metrics to obtain extended decision metrics, on line 1005, for all bits in a rate-adaptive OTUk frame including (m) slots, where (m) is a positive integer. For example, the received signal may be carried in an optical channel. The demapper 1002 performs a FEC decoding of the extended decision metrics, using FEC decoder 1006 for example, to obtain decoded bits. From the decoded bits, the demapper 1002 extracts client information carried in a set (n) allocated slots, where (n) is a positive integer less than or equal to (m).

In one aspect, the PHY device 1003 obtains extended decision metrics identical to the decision metrics, and the demapper 1002 uses the set of (n) allocated slots to determine a set of parity decision metrics from among the extended decision metrics. In other words, the demapper is able to recognize slots carrying FEC information by determining the location of the (n) allocated slots, see FIG. 7.

In another aspect, the PHY device 1003 recognizes which allocated slots include dummy bits, see FIG. 9, and obtains the extended decision metrics by adding locally generated decision metrics to fill in some of the bits that were discarded by a communicating transmitter. Having obtained extended decision metrics for all bits in the rate-adaptive OTUk frame, the PHY device 1003 passes them to the demapper 1002 on line 1005. The demapper then performs FEC decoding using FEC decoder 1006, and uses OTUk signaling to extract client information in the allocated slots. Although the FEC decoder is shown as located in the demapper, alternatively, it may be located in the PHY device.

Figure 11:
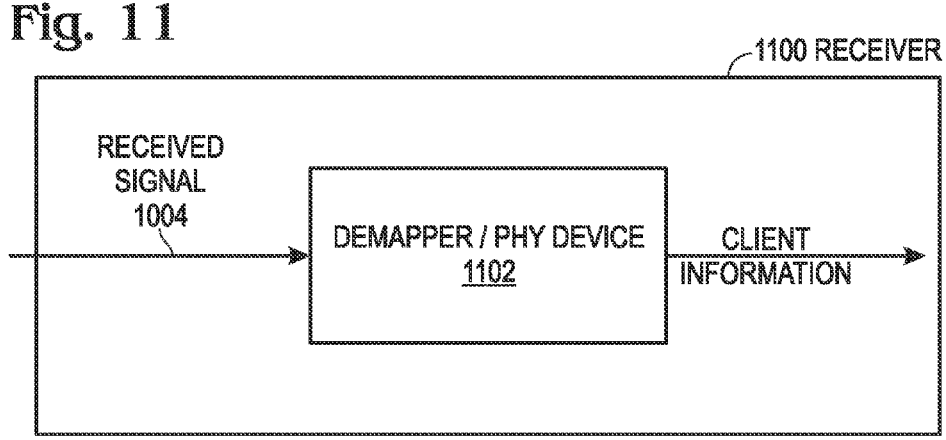
FIG. 11 is a block diagram depicting a variation of the receiver of FIG. 10.

FIG. 11 is a block diagram depicting a variation of the receiver of FIG. 10. In this aspect, the receiver 1100 comprises a joint demapper/physical layer device 1102 having an interface on line 1104 to accept a received signal. The demapper/physical layer device 1104 processes the received signal using a modulation scheme, and determines the location of client information decision metrics in a rate-adaptive OTUk frame comprising (m) slots, where (m) and (n) are positive integers and (n) is less than or equal to (m). The demapper/physical layer device 1104 generates dummy decision locations, adds dummy decision metrics to the client information decision metrics, and extracts client information carried in the set (n) allocated slots. That is, dummy bits are discarded from the unallocated slots.

Functional Description

As pointed out by McGhan (D. L. McGhan, W. Leckie, C. Chen, Reconfigurable Coherent Transceivers for Optical Transmission Capacity and Reach Optimization, OW4C.7, OFC 2012), three factors can be changed to exploit channel quality. These factors are: 1) the total data rate transmitted on a link, 2) the number of information bits per baud, determined by the modulation scheme and the FEC code rate, and 3) the baud rate, and consequently, the bandwidth of the channel.

One adaptation approach is the use of flexible grid (or "gridless") systems which typically maintain a fixed data rate B and FEC code rate R (O. Gerstel et al, "Elastic Optical Networking: A New Dawn for the Optical Layer?", IEEE Comm. Mag., pp. S12-20, February 2012). Thus, OTN frames are generated at G.709-compatible OTUk rates (around 100 Gbit/s for k=4) (ITU-T G.7091Y.1331, "Interfaces for the Optical Transport Network (OTN)", February 2012). The modulation scheme can be varied between, for example, PM-16QAM, PM-8PSK and PM-QPSK. The resulting baud rate determines the occupied bandwidth of the channel. This approach ensures that digital interfaces run at standard rates, but requires the optical layer (including ROADMs, filters, and transceivers) to handle channels of continuously varying bandwidth and center frequency.

Disclosed herein is an alternative approach that maintains a fixed sampling frequency and bandwidth, but varies the client data rate. The data rate can be varied by exploiting the OTN frame structure, which allows for multiplexing many slots in each frame. By varying the number of slots carrying data, the data rate can be adapted. The slots are allocated to standard ODUj and packet clients, and valid OTN frame structures are used. Consequently, no modification is needed to currently defined serial interfaces, thus circumventing a major challenge in data rate adaptation.

The approach presented herein is to transport standard OTN frames, and to vary the data rate by controlling the number of tributary slots allocated to actual clients. Since each slot can be individually turned on or off, the data rate can be varied with a granularity of 1.25 Gbps (ODU0). Further, note that existing OTN signaling suffices to indicate which slots are allocated to data. No additional signaling is needed.

The first step is the mapping of client data onto allocated slots. Some n slots out of the available $N_s$ slots are allocated to data transmission. Note: $N_s$ has been defined above as (m), and the symbol n is equivalent to the symbol (n). Typically, in order to simplify the design, a set of valid values of n are defined, thus determining the allowed data rates for a given OTUk rate. For example, $N_1=\{40, 80\}$ in an 80-slot OTU4 results in data rates of roughly 50 and 100 Gbps. Note also that multiplexing can generate multiple OTN frames in parallel. Thus, $N_2=\{40, 80, 120, 160\}$ generates data rates of $\{50, 100, 150, 200\}$ Gbps using two parallel OTU4 frames. In this case, it is assumed that the number of allocated slots in each of the parallel frames is roughly the same.

The number of allocated slots is chosen based on the channel quality or available traffic by some mechanism. Given the allocated slots, multiplexing first involves standard mapping of the clients into these slots. If the available clients do not fill all allocated slots, the remaining slots are filled in with some sequence of dummy bits.

Standard OTN overhead is added to indicate Operations and Management (OA & M), frame synchronization and client-to-slot mapping. Bits in the allocated slots can be used to fill out the OTUk frame and transmitted via the optical channels using one of two methods: the parityFill method fills out the OTUk frame with parity bits from a variable-rate FEC, while the dummyPuncture method fills the OTUk frame with dummy bits which are discarded before modulation.

In the first method, termed parityFill, a forward error correction code operates only on the bits in the allocated slots, and generates enough parity bits to fill the frame (including the unallocated slots and the FEC overhead columns in the OTN frame). This filled frame is then modulated to generate baud-rate samples which are then transmitted using an optical modulator.

At the receiver, decision metrics (hard or soft) are generated for all the transmitted bits. The receiver then performs FEC decoding to extract the bits in the allocated slots. Note that this requires knowledge of the allocated slot locations (equivalently the FEC input size), which could be either configured at the receiver or automatically detected by trial and error. The criterion used to determine the slot allocation by trial and error can be (i) internal FEC error check if available, for example the number of satisfied check nodes in a Low-Density Parity-Check (LDPC) code or the solvability of the Berlekamp Massey equations in a Reed Solomon code, (ii) consistency of the OTN overhead signaling, specifically the frame allocation symbols and the client/slot mapping which should be consistent with the original hypothesis for multiple successive frames.

As the number of allocated slots varies, note that the FEC has variable input length but fixed number of output bits. Some considerations for designing such a FEC are described below.

Note further that the modulation of the OTN frame and the demodulation at the receiver can be done on transceiver chips that are physically different from the framer chip. In this case, standard digital interfaces like CAUI can be used to carry the filled-out OTN frame between the framer and the transceiver. Indeed, this method can be used in a framer to extend the range of an existing PHY transceiver, as described in the muxponder example below.

In the second method, termed dummyPuncture, dummy bits are used to fill in the unallocated slots in the OPU and a fixed-rate FEC is used on all the slots to obtain parity bits. In other words, this follows standard OTN multiplexing and encoding procedure.

Rate adaptation is done at the modulation stage. Here, dummy bits inserted in the unallocated slots are punctured (discarded) before generating the bit stream for modulation. Not all dummy bits may be punctured. In particular, it may be advisable to slightly vary the puncturing pattern depending on the number of allocated slots n in order to preserve the same sampling frequency. This is illustrated in a concrete example below.

At the receiver, decision metrics are generated for the unpunctured bits. In addition, perfect decision metrics for the punctured dummy bits are generated, since their values are known to the receiver given the slot allocation information. The combination of received decision metrics and locally generated decision metrics for the dummy bits is passed through the FEC decoder, which then yields bits in the allocated slots and hence client information.

Similar to the parityFill method, either local configuration or trial-and-error can be used to determine the allocated slots in the variable-rate frame. Again, modulation and demodulation can be done in a physical transceiver chip different from the framer. However, in this case, the transceiver chip needs to detect the unallocated slots and puncture (add) their content in the transmitter (receiver).

Figure 12:
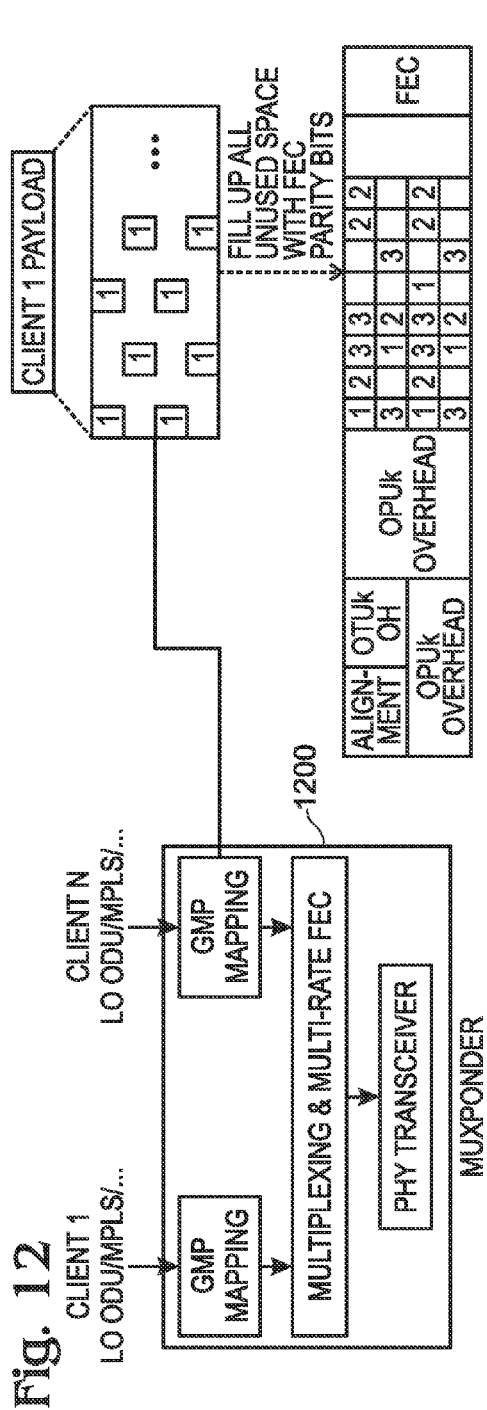
FIG. 12 depicts a muxponder system comprising an OTN framer/multiplexer including a parityFill encoder and a PHY designed to transport 100 Gbps using, for example, PM-QPSK modulated samples at a baud rate of 28 Gbaud.

FIG. 12 depicts a muxponder system comprising an OTN framer/multiplexer including a parityFill encoder and a PHY designed to transport 100 Gbps using, for example, PM-QPSK modulated samples at a baud rate of 28 Gbaud. The muxponder 1200 supports multiple 10 GbE clients, each of which may be individually turned on or off. Each client is assigned some eight slots in the OTU4 frame. The number of allocated slots is N1={40, 80}. Correspondingly, the maximum number of active clients is 5 and 10, respectively. As described above, the A clients' data is mapped into some 8A allocated slots and dummy bits are stuffed into the remaining (n-8A) allocated slots. After stuffing, the FEC input now consists of 40 or 80 allocated slots. Noting that each slot spans 190 bytes per frame, and including 64 bytes corresponding to the first 16 columns carrying ODU, OUT, and OPU overhead, the FEC input lengths are $\{K_i\}=\{7664, 15264\}$ bytes respectively. Now, the FEC encodes the above input, and obtains parity bytes to fill in all 16320 bytes in the OTU4 frame, hence the two FEC code rates are {0.4696, 0.9353} respectively. This frame can then be transmitted to a PHY modulation device using, for example, PM-QPSK modulation.

It is worth pointing out that the PHY transceivers at both transmitter and receiver see valid OTU4 frames, including frame boundary signaling, etc. Thus, the rate adaptation can be performed with an existing 100G PHY transceiver (without internal FEC), in order to reduce the data rate, if the OSNR is not high enough to support the full rate. The error rate at the PHY transceiver output (i.e., the FEC input) is high for the low data rate mode, and is only reduced to $10^{-15}$ or less after FEC decoding. Consequently, the above scheme works best when synchronization, tracking, etc., in the PHY transceiver operate in the high-BER regime.

Figure 13:
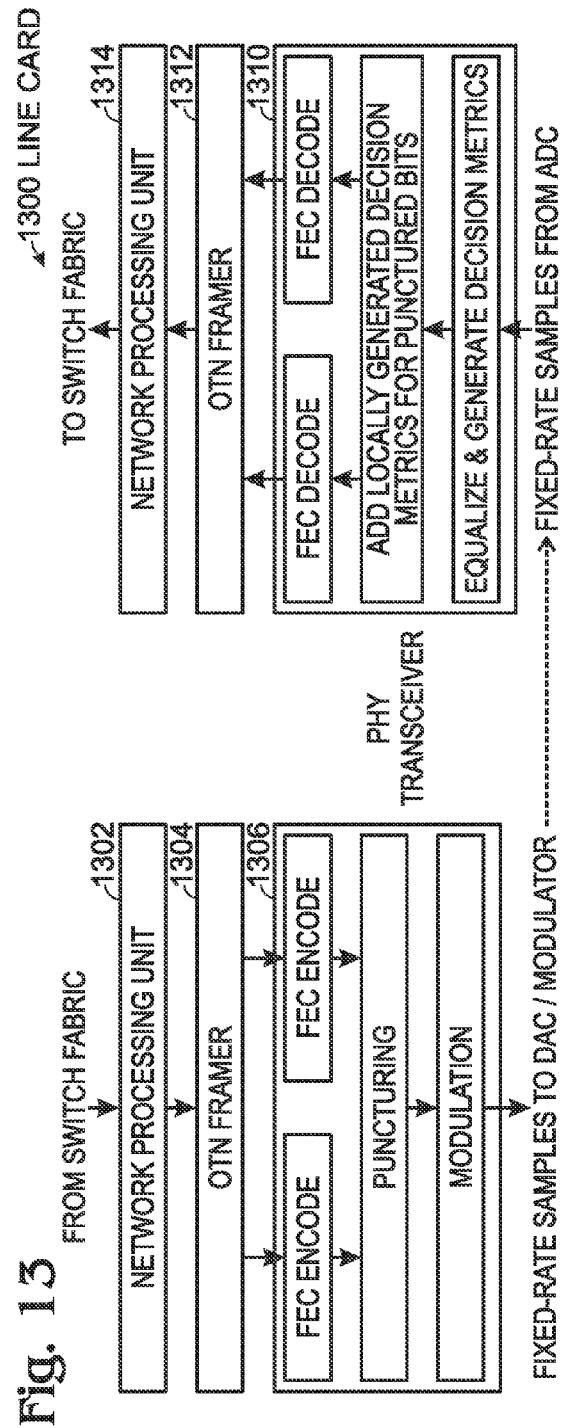
FIG. 13 depicts a system with a Flex-rate Line card using dummyPuncture.

FIG. 13 depicts a system with a Flex-rate Line card using dummyPuncture. This example describes the use of adaptive modulation in a line card to support data rates of 100/150/200 Gbps at a sample rate of F=32 Gsps using PM-QPSK/PM-8PSK and PM-16QAM modulations respectively. The line card 1300 comprises a network processing unit (NPU) 1302 that gets data from the backplane, front-line queues it, and sends it to the framer chip 1304 through a variable rate packet interface, such as Interlaken (Interlaken Alliance, "Interlaken Protocol Definition Revision 1.2," October 2008).

In the framer chip, the virtual client on the Interlaken interface is GFP-encapsulated into one (for 100G) or two (150/200G) parallel OTN frames. The corresponding total number of allocated slots is N2={80, 120, 160}, with the latter two divided equally among the two active OTN frames. The unallocated slots are filled with dummy bits, and the resulting OTN frames are conveyed on two parallel 100G (say CAUI) interfaces to the physical transceiver 1306. For 100G operation, only one 100G interface is necessary between the framer and the transceiver, and the other interface could be turned off.

FEC encoding can be done either in the framer 1304 or in the transceiver 1306. In either case, assuming that a standard FEC (roughly 7% overhead), the FEC output contains 16320 bytes per OTU4 frame, carried at a rate of approximately 111.81 Gb/s.

The FEC outputs corresponding to the 80- and 160-slot allocations are modulated with PM-QPSK and PM-16QAM modulations respectively, yielding samples at 111.81/4=27.9525 Gs/s, transmitting 16320 and 32640 bytes per frame duration respectively. In order to support the n=120 mode, PM-8PSK is used. To maintain the same sample rate, puncturing is designed so as to retain 24480 bytes per frame duration. One possible puncturing strategy is to retain the OTN overhead (the first sixteen columns of each frame) and the allocated slots themselves (190 bytes per slot*60 slots per OTN frame). This corresponds to 22928 bytes of "systematic" information. Then, of the 2048 parity bytes in each OTN frame, only 1552 are transmitted, yielding the desired total of 24480 bytes. All the other bytes in the OTN frames, including dummy bits in unallocated slots, stuff bytes in the OTN frame, and 496 parity bytes per slot are punctured. Using this procedure, data throughputs of roughly 100, 150, 200 Gbps are transmitted at a constant sampling rate of 27.9525 Gb/s, even though the FEC overhead and hence the robustness of the 8-PSK mode is slightly less than the other two.

The receiver performs the reverse of the indicated operations, i.e., it first recovers hard or soft decisions on the coded bits. Based on its knowledge of the puncturing pattern, it adds locally generated decision metrics on the punctured bits and performs FEC decoding on the result.

The resultant output is formatted again into OTN frames with dummy bits in unallocated client slots and sent on a local serial interface to the de-mapper chip 1312, which then communicates with the ingress NPU 1314 on the line card.

The modulation format may be signaled to the receiver using say a frame header, or it may be configured at the receiver. Alternatively, the receiver can just try all possible modulation formats, with corresponding puncturing patterns, until it achieves frame lock and low BER.

Figure 1:
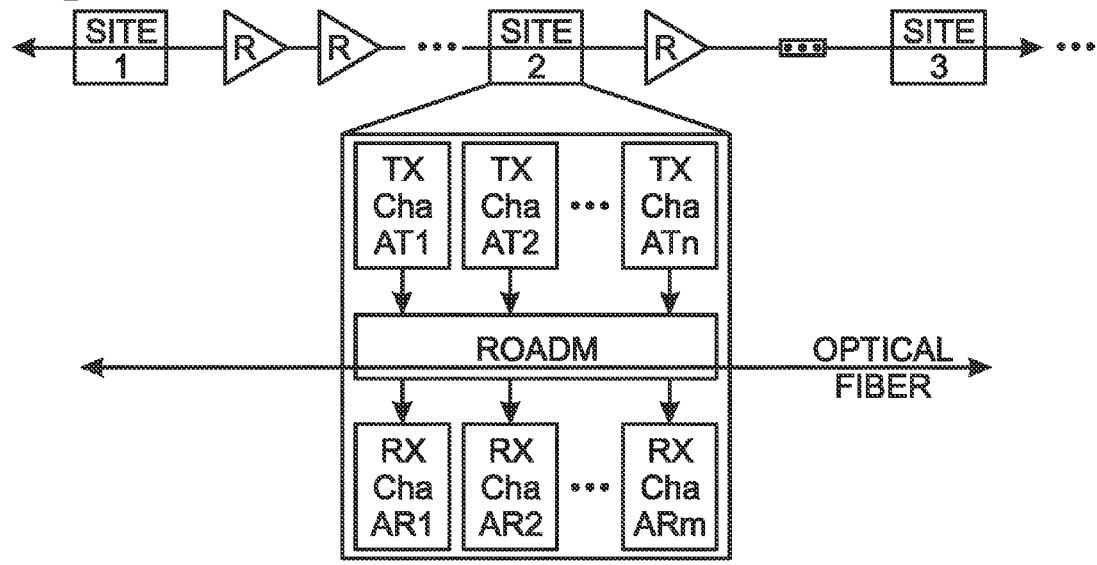
FIG. 1 is a schematic diagram depicting a conventional OTN system (prior art).
Figure 2:
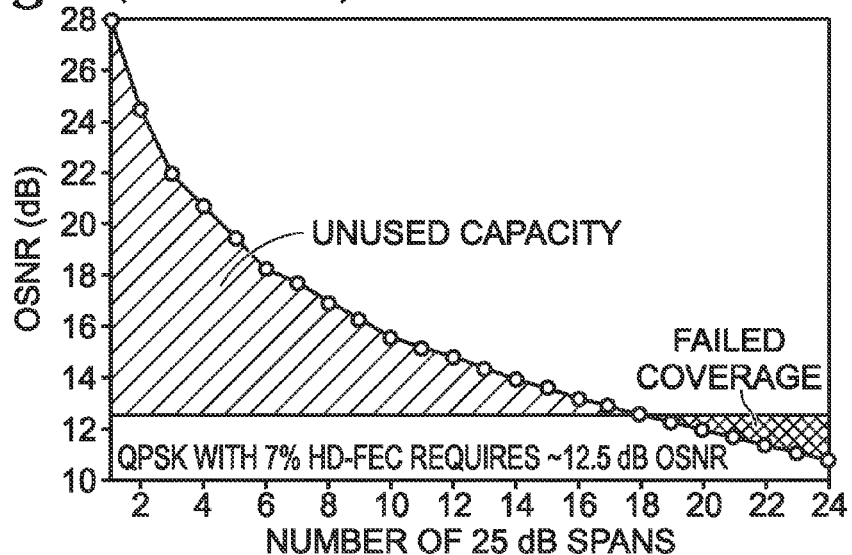
FIG. 2 is a graph depicting optical signal-to-noise (OSNR) to the number of spans (prior art).
Figure 4:
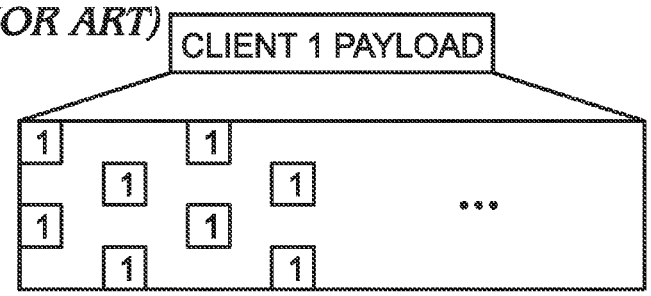
FIG. 4 is a diagram depicting the position of a tributary slot within an OPUk payload area (prior art).
Figure 14:
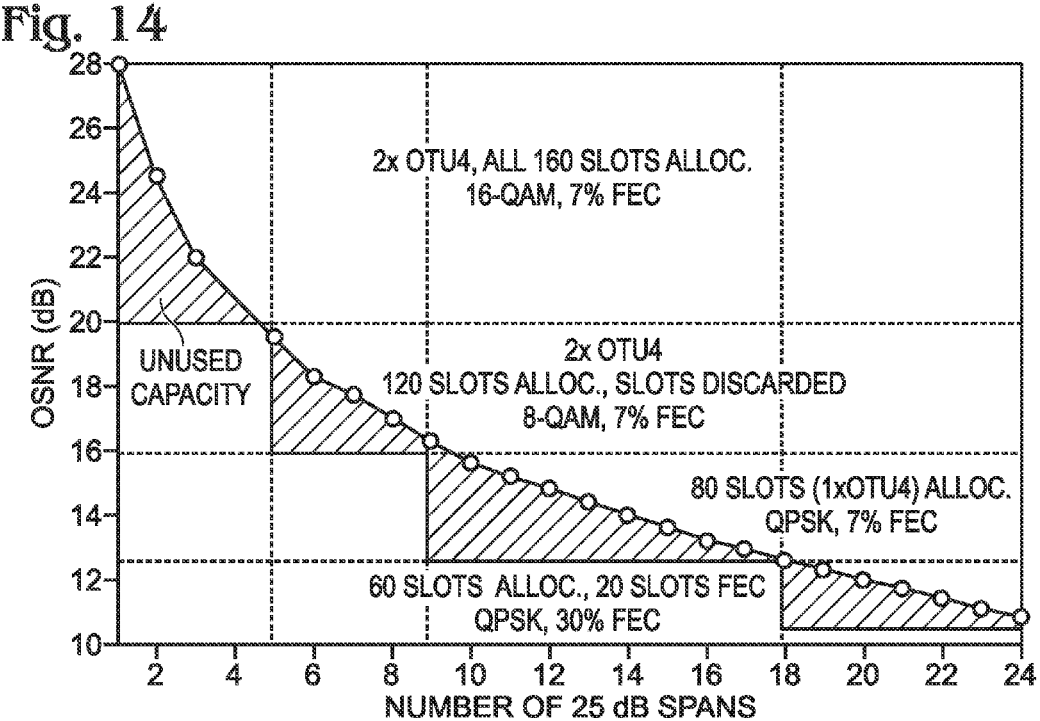
FIG. 14 is a graph illustrating data rate v. span in a hybrid mode that varies slot allocation, modulation schemes, and code rates.

FIG. 14 is a graph illustrating data rate v. span in a hybrid mode that varies slot allocation, modulation schemes, and code rates. Both parityFill and dummyPuncture methods are used in different operating modes, corresponding to different OSNR. This flexible system supports four modes. Each mode is characterized by a combination of (no. of data-allocated slots, no. of slots discarded/filled with FEC, modulation scheme and code rate), and corresponds to a certain range of distance and OSNRs, as shown by the dotted grid lines in the figure. Note that 150 Gbps is achieved by using 8-QAM and with discarding of slots (as described in the line card example), while 75 Gbps is achieved by maintaining QPSK modulation but filling unused slots with FEC parity bits, as described in the muxponder example. The shaded region shows the unused capacity in each mode. In comparing to FIG. 2, it is easy to see a significantly higher fraction of capacity is achieved at distances below 18 spans, and the range is extended above 18 spans by reducing the code rate with PM-QPSK modulation. The actual OSNR numbers may vary depending on implementation, but the same trends apply.

In both the parityFill and dummyPuncture approaches, the effective FEC code rate varies to better approach the limits of the capacity vs. distance curve. This section discusses some general requirements for such a scalable FEC.

The use of scalable FEC to vary the data rate is well-established, even in the context of optical transport. ITU-T G.9750 FEC option 1.7 specifies three different code rates 93%, 89% and 75% to cover three target values of net coding gain spaced by roughly 1 dB. Another recent publication (Savory et al.) has also proposed the idea of variable rate FEC, by puncturing and shortening a product code. However, the case of scalable FEC design with soft-decision decoders has not been considered in the literature.

Presented below are some considerations for the design of variable rate FEC schemes.

1. As noted in the discussion of the variable rate transponder, a low-rate FEC decoder can correct a higher input error rate, but this also implies the synchronization and equalization algorithms may not be able to use decision-directed algorithms. Specifically, decision-directed phase tracking and LMS algorithms may not work as well. The alternative is to either use non decision-directed techniques, or insert a sufficient number of known pilot symbols to help these tasks.

2. The codes for different rates can be defined independently, or they can belong to a structurally similar family. One specific case of interest is the use of LDPC codes where the output blocklength (number of variable/bit nodes) is kept constant, while changing only the number of check nodes (equivalently the parity check matrix). Structured codes can also be used to achieve this result.

3. When higher order modulation such as 16-QAM is used, two different types of coding may be considered. Conventionally, a single FEC code has been used to jointly code all modulated bits. This technique, known as bit interleaved coded modulation works well with Gray-coded modulation. An alternative is to use multilevel coding, wherein the modulation is not Gray coding and different FEC codes with different rates are used for the different bits. For example, the "MSB" of 16-QAM, which has a lower error rate, can use a higher code rate and the "LSB" could use a lower code rate. This can be further improved by doing successive decoding, where the low-rate LSB is decoded first, and the decision is used to decode the high-rate stream. Note that it is necessary to buffer up the FEC input for the high-rate bits while the FEC decoder for the low-rate bits is running. To limit memory, it may be necessary to use hard decision decoding for the high-rate bits (requires just two bits of storage, one for each possible decision on the low-rate bit).

Figure 15:
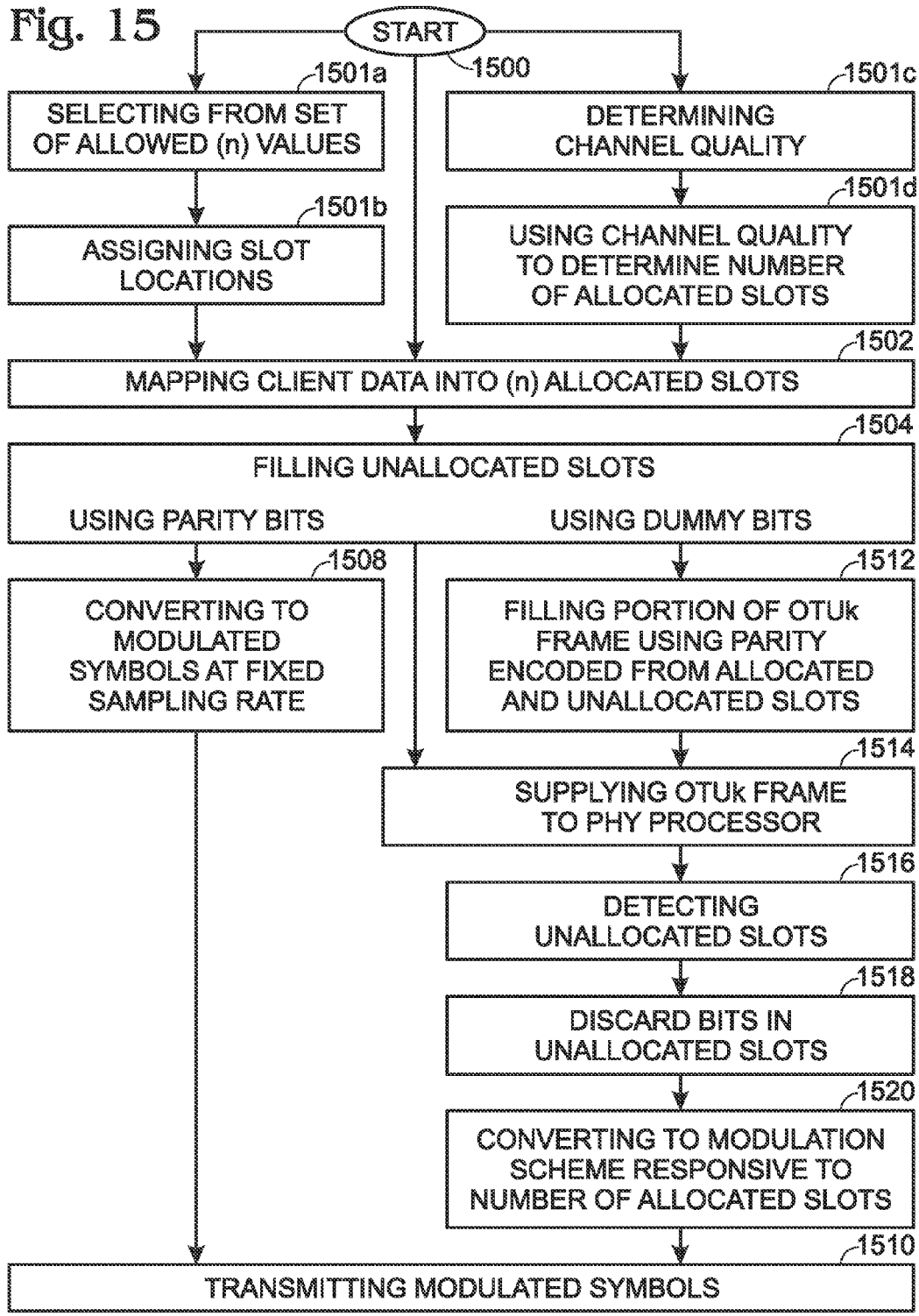
FIG. 15 is a flowchart illustrating a method for generating a rate-adaptive OTUk frame in an OTN device.

FIG. 15 is a flowchart illustrating a method for generating a rate-adaptive OTUk frame in an OTN device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1500.

Step 1502 maps client input data into a set of (n) allocated slots in a rate-adaptive OTUk frame comprising (m) slots, where (n) and (m) are positive integers, and where (n) is less than or equal to (m). Step 1504 fills the rate-adaptive OTUk frame, including (m−n) unallocated slots, using a process that either fills the rate-adaptive OTUk frame using parity bits computed from client input data (parityFill), or fills at least a portion of the rate-adaptive OTUk frame with dummy bits (dummyPuncture).

In one aspect, Step 1501*a* assigns a value to the number of allocated slots, selected from a predetermined set of allowed (n) values. For each value of (n), Step 1501*b* assigns a slot location from a set of predetermined slot locations in the rate-adaptive OTUk frame.

In another aspect, Step 1501*c* determines a channel quality including an optical signal-to-noise rate (OSNR). Step 1501*d* uses the channel quality to determine the number of allocated slots, where a higher channel quality is associated with a greater number of allocated slots.

In one aspect, mapping client data into allocated slots in Step 1502 includes filling at least one allocated slot with dummy bits when the client input data does not fill all (n) allocated slots. Then, filling the rate-adaptive OTUk frame using parity bits computed from client data in Step 1504 includes filling with FEC bits computed from data in the allocated slots.

In another aspect, Step 1508 converts the rate-adaptive OTUk frame into a sequence of modulated symbols at a fixed sampling rate. Step 1510 transmits the sequence of modulated symbols on an optical channel at a fixed optical channel bandwidth.

In one aspect, Step 1504 fills a portion of the rate-adaptive OTUk frame with dummy bits, then Step 1512 may fills a portion of the rate-adaptive OTUk frame (e.g. the FEC section) using a set of parity bits computed using FEC encoding on data in the allocated and unallocated slots in the rate-adaptive OTUk frame.

In another aspect, Step 1514 supplies the rate-adaptive OTUk frame to a physical layer processor. In Step 1516 the physical layer detects unallocated slots in the rate-adaptive OTUk frame. Step 1518 discards some bits in the rate-adaptive OTUk frame, including at least one bit in the unallocated slots, to obtain a transmit bit stream. Step 1520 converts the transmit bit stream into a sequence of modulated symbols using a modulation scheme. In some aspect, the modulation scheme is responsive to the number of allocated slots, where a higher order of modulation permits a greater number of slots to be allocated. Step 1510 transmits the modulated symbols on an optical channel.

FIG. 16 is a flowchart illustrating a method for receiving client information from a rate-adaptive OTUk frame in an OTN device. The method starts at Step 1600. Step 1602 processes a received signal using a modulation scheme to obtain decision metrics for all bits in a received bitstream.

Step 1604 uses the decision metrics to obtain extended decision metrics for all bits in a rate-adaptive OTUk frame including (m) slots, where (m) is a positive integer. Step 1606 performs a FEC decoding of the extended decision metrics to obtain decoded bits. From the decoded bits, Step 1608 extracts client information carried in a set (n) allocated slots, where (n) is a positive integer less than or equal to (m).

In one aspect, Step 1607a determines either the modulation scheme or the set of (n) allocated slots by accessing a configuration value. Alternatively, Step 1607b defines a set of hypotheses comprising possible values for at least one of the modulation scheme and the set of (n) allocated slots. Step 1607c determines either the modulation scheme or the number of (n) allocated slots in response to selecting a hypothesis from the set of hypotheses. For example, Step 1607c may determine the number of (n) allocated slots using the following substeps. Step 1607c1 locates slots in the rate-adaptive OTUk frame filled with parity bits, and in response to locating the slots filled with parity bits, Step 1607c2 determines the set of (n) allocated slots. Alternatively, Step 1607c may select the hypothesis based upon a measurement of a frame sync sequence of FEC decoded bits, a FEC decoder accuracy metric, or OTN overhead signaling consistency.

In one aspect, using the decision metrics to obtain extended decision metrics for all bits in a rate-adaptive OTUk frame in Step 1604 includes the decision metrics being identical to the extended decision metrics. Then, performing the FEC decoding in Step 1606 includes using the set of (n) allocated slots to determine a set of parity decision metrics from among the extended decision metrics.

In another variation, using the decision metrics to obtain extended decision metrics for all bits in a rate-adaptive OTUk frame in Step 1604 includes substeps. Step 1604a generates dummy decision locations in response to determining the location of client information decision metrics in the (n) allocated slots. Step 1604b adds dummy decision metrics to the client information decision metrics to obtain the extended decision metrics.

Figure 17:
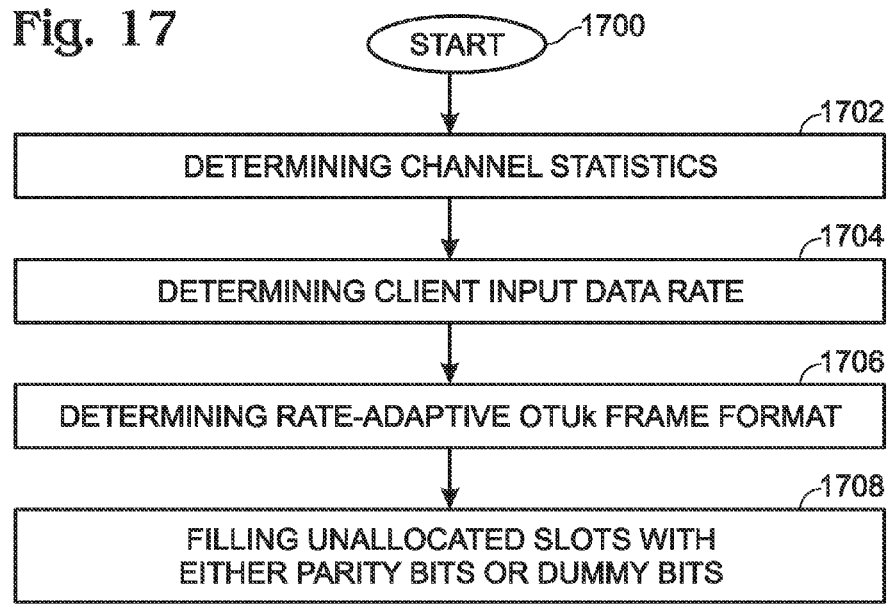
FIG. 17 is a flowchart illustrating a method for communicating rate-adaptive OTUk frames in an OTN system.

FIG. 17 is a flowchart illustrating a method for communicating rate-adaptive OTUk frames in an OTN system. The method begins at Step 1700. Step 1702 determines channel statistics (e.g., channel quality and/or OSNR) for a fiber span connecting a transmitter to a receiver. Step 1704 determines a client input data rate sufficient to meet a minimum communication threshold. Step 1706 determines a rate-adaptive OTUk frame format sufficient to carry the client input data rate. The format comprises a set of (n) allocated slots of client input data in a rate-adaptive OTUk frame comprising (m) slots, where (n) and (m) are positive integers, and where (n) is less than or equal to (m). Step 1708 fills the rate-adaptive OTUk frame, including (m−n) unallocated slots, using a process that either fills the rate-adaptive OTUk frame with parity bits computed from client input data, or fills at least a portion of the rate-adaptive OTUk frame with and dummy bits.

Presented herein are system and methods that take advantage of channel quality over optical fiber links with varying distance and OSNR. While past work has focused on flex-spectrum techniques which adapt the sampling rate and channel bandwidth necessary to transport a given data rate, the approach presented herein adapts the data rate for a fixed bandwidth. The data rate is adapted by varying the number of time division multiplexing (TDM) slots in an OTN frame which are allocated to data. The remaining slots are either discarded before modulation, or filled with FEC parity bits which are also modulated. Examples for both methods have presented for the cases of a flexible rate muxponder and a line card in a router. In both these cases, data rate adaptation is achieved with existing serial interfaces and signaling. However, the invention is not limited to merely these examples. Other variations and embodiments of the invention will occur to those skilled in the art.

We claim:

1. In an Optical Transport Network (OTN) device, a method for generating a rate-adaptive OTUk frame, the method comprising:
    mapping client input data into a set of (n) allocated slots in a rate-adaptive OTUk frame comprising (m) slots, where (n) and (m) are positive integers, and where (n) is less than or equal to (m);
    determining a channel quality comprising an optical signal-to-noise rate (OSNR) between a transmitter and a receiver;
    using the channel quality to determine the number of allocated slots in a payload, where a higher channel quality is associated with a greater number of allocated slots;
    filling the rate-adaptive OTUk frame, comprising (m−n) unallocated slots, using a process selected from the group consisting of: (1) filling the rate-adaptive OTUk frame using parity bits computed from client input data, and (2) filling at least a portion of the rate-adaptive OTUk frame with dummy bits;
    supplying the rate-adaptive OTUk frame to a physical layer processor;
    the physical layer processor detecting unallocated slots in the rate-adaptive OTUk frame;
    discarding some bits in the rate-adaptive OTUk frame, including at least one bit in the unallocated slots, to obtain a transmit bit stream;
    converting the transmit bit stream into a sequence of modulated symbols using a modulation scheme; and
    transmitting the modulated symbols on an optical channel, wherein converting the transmit bit stream to the sequence of modulation symbols comprises the modulation scheme being responsive to the number of allocated slots, where a higher order modulation scheme permits a greater number slots to be allocated.

2. The method of claim 1 further comprising:
    assigning a value to the number of allocated slots, selected from a predetermined set of allowed (n) values; and,
    for each value of (n), assigning a slot location from a set of predetermined slot locations in the rate-adaptive OTUk frame.

3. The method of claim 1 wherein mapping client data into allocated slots includes filling at least one allocated slot With dummy bits when the client input data does not fill all (n) allocated slots.

4. The method of claim 3 wherein filling the rate-adaptive OTUk frame using parity bits computed from client data includes filling with forward error correction (FEC) bits computed from data in the allocated slots.

5. The method of claim 4 further comprising:
    converting the rate-adaptive OTUk frame into a sequence of modulated symbols at a fixed sampling rate; and,
    transmitting the sequence of modulated symbols on an optical channel at a fixed optical channel bandwidth.

6. The method of claim 1 wherein filling at least a portion of the rate-adaptive OTUk frame with dummy bits comprises filling the unallocated slots with dummy bits; and,
    the method further comprising:
    filling a portion of the rate-adaptive OTUk frame using a set of parity bits computed using FEC encoding on data in the allocated and unallocated slots in the rate-adaptive OTUk frame.

7. In an Optical Transport Network (OTN), a transmitter for generating a rate-adaptive OTUk frame, the transmitter comprising:

a mapper having at least one client interface to accept client input data, the mapper is operable to map the client input data into a set of (n) allocated slots in a rate-adaptive OTUk frame comprising (m) slots, where (n) and (m) are positive integers, and where (n) is less than or equal to (m), the mapper is operable to determine a channel quality comprising an optical signal-to-noise rate (OSNR) between the transmitter and a receiver and using the channel quality to determine the number of allocated slots in a payload, where a higher channel quality is associated with a greater number of allocated slots, the mapper is also operable to fill the rate-adaptive OTUk frame, comprising (m−n) unallocated slots, using a process selected from the group consisting of filling the rate-adaptive OTUk frame using parity bits computed from client input data and filling at least a portion of the rate-adaptive OTUk frame with dummy bits, the mapper is also operable to supply the rate-adaptive OTUk frame to a physical layer processor, wherein the physical layer processor detects unallocated slots in the rate-adaptive OTUk frame, the mapper is operable to discard some bits in the rate-adaptive OTUk frame, including at least one bit in the unallocated slots, to obtain a transmit bit stream, convert the transmit bit stream into a sequence of modulated symbols using a modulation scheme, and transmit the modulated symbols on an optical channel, wherein converting the transmit bit stream to the sequence of modulation symbols comprises the modulation scheme being responsive to the number of allocated slots, where a higher order modulation scheme permits a greater number slots to be allocated.

8. The transmitter of claim 7 wherein the mapper is operable to fill at least one allocated slot with dummy bits when the client input data does not fill all (n) allocated slots, and fills unallocated slots with forward error correction (FEC) bits computed from data in the allocated slots.

9. The transmitter of claim 7 wherein the mapper is operable to fill fills the unallocated slots with dummy bits, and fills a portion of the rate-adaptive OTUk frame using a set of parity bits computed using FEC encoding on data in the allocated and unallocated slots in the rate-adaptive OTUk frame.

10. The transmitter of claim 7 further comprising:

a physical layer device having an electrical interface configured for accepting the rate-adaptive frame, the physical layer device is configured for detecting unallocated slots in the rate-adaptive OTUk frame, discarding some bits in the rate-adaptive OTUk frame, including at least one bit in the unallocated slots, to obtain a transmit bit stream, and converting the transmit bit stream into a sequence of modulated symbols, the physical layer device having an optical interface to transmit the modulated symbols on an optical channel.

11. The transmitter of claim 7, wherein the mapper is operable to assign a value to the number of allocated slots, selected from a predetermined set of allowed (n) values.

12. The transmitter of claim 11, wherein the mapper is operable to assign a slot location from a set of predetermined slot locations in the rate-adaptive OTUk frame for each value of (n).

13. The transmitter of claim 7, wherein the mapper is operable to convert the rate-adaptive OTUk frame into a sequence of modulated symbols at a fixed sampling rate.

14. The transmitter of claim 13, wherein the transmitter is operable to transmit the sequence of modulated symbols on an optical channel at a fixed optical channel bandwidth.

15. In an Optical Transport Network (OTN) system, comprising:

a transmitter, operable to:
determine channel statistics comprising an optical signal-to-noise rate for a fiber span connecting a transmitter to a receiver;
determine a client input data rate sufficient to meet a minimum communication threshold;
determine a rate-adaptive OTUk frame format sufficient to carry the client input data rate, the format comprising a set of (n) allocated slots in a payload of client input data in a rate-adaptive OTUk frame comprising (m) slots, where (n) and (m) are positive integers, and where (n) is less than or equal to (m);
fill the rate-adaptive OTUk frame, including (m−n) unallocated slots, using a process selected from the group consisting of filling the rate-adaptive OTUk frame with parity bits computed from client input data and filling at least a portion of the rate-adaptive OTUk frame with and dummy bits
supply the rate-adaptive OTUk frame to a physical layer processor;
the physical layer processor detecting unallocated slots in the rate-adaptive OTUk frame;
discard some bits in the rate-adaptive OTUk frame, including at least one bit in the unallocated slots, to obtain a transmit bit stream;
convert the transmit bit stream into a sequence of modulated symbols using a modulation scheme; and
transmit the modulated symbols on an optical channel, wherein converting the transmit bit stream to the sequence of modulation symbols comprises the modulation scheme being responsive to the number of allocated slots, where a higher order modulation scheme permits a greater number slots to be allocated.

16. The OTN system method of claim 15, wherein the transmitter is further operable to:
assign a value to the number of allocated slots, selected from a predetermined set of allowed (n) values.

17. The OTN system method of claim 16, wherein the transmitter is further operable to:
assign a slot location from a set of predetermined slot locations in the rate-adaptive OTUk frame for each value of (n).

18. The OTN system method of claim 15, wherein the transmitter is further operable to:
convey the rate-adaptive OTUk frame into a sequence of modulated symbols at a fixed sampling rate.

* * * * *